US005646869A

United States Patent [19]
Kaneko

[11] Patent Number: 5,646,869
[45] Date of Patent: Jul. 8, 1997

[54] NUMERICAL SIMULATION SYSTEM FOR A PHYSICAL SYSTEM SUFFERING RANDOM DISTURBANCE

[75] Inventor: Junji Kaneko, Kawasaki, Japan

[73] Assignee: Fujitsu Limited, Kawasaki, Japan

[21] Appl. No.: 331,102

[22] Filed: Oct. 28, 1994

[30] Foreign Application Priority Data

Nov. 10, 1993 [JP] Japan .................. 5-281524

[51] Int. Cl.$^6$ .................................. G06F 17/50
[52] U.S. Cl. ............... 364/578; 364/224.21; 364/224.2; 364/554; 364/148; 395/207
[58] Field of Search .................. 364/488, 489, 364/490, 578, 575, 468, 554, 224.1, 224.2, 224.21, 224.3, 148, 402; 395/500

[56] References Cited

U.S. PATENT DOCUMENTS

| | | | |
|---|---|---|---|
| 4,604,718 | 8/1986 | Norman et al. | 364/578 |
| 4,791,547 | 12/1988 | Petroff | 364/138 |
| 4,796,194 | 1/1989 | Atherton | 364/468 |
| 4,881,172 | 11/1989 | Miller | 364/424.05 |
| 5,229,948 | 7/1993 | Wei et al. | 364/468 |
| 5,289,384 | 2/1994 | Akiyama | 364/488 |
| 5,296,794 | 3/1994 | Lang et al. | 318/715 |
| 5,446,870 | 8/1995 | Hinsberg, III et al. | 395/500 |
| 5,468,088 | 11/1995 | Shoemaker et al. | 405/52 |

*Primary Examiner*—Kevin J. Teska
*Assistant Examiner*—Thai Phan
*Attorney, Agent, or Firm*—Staas & Halsey

[57] ABSTRACT

A simulator includes an initialization unit, an increment generating unit, an approximate value updating unit, and an output unit. The initialization unit enters into the increment generating unit an initial value of a state quantity and a function that describes a system subjected to random disturbance. The increment generating unit uses two sequences of random numbers to generate an increment of the approximate value of the state quantity without calculating a derivative of the function. The approximate value updating unit updates the approximate value using the generated time increment. The output unit provides a result of a simulation of that system, which has a 1.5-order accuracy of a approximation.

24 Claims, 12 Drawing Sheets

NUMERICAL SIMULATION SYSTEM FOR A PHYSICAL SYSTEM SUFFERING RANDOM DISTURBANCE

BACKGROUND OF THE INVENTION

1. Field of the Invention

The present invention relates to a simulation system which performs a numerical simulation of a system that suffers random disturbance.

2. Description of the Related Art

In the field of the natural sciences, it is generally difficult to analytically solve a mathematical model that describes a physical system. In most cases, the initial-value problem in the mathematical model is solved approximately by means of numerical processing. With the recent advance of information processing technology, a wide variety of simulators adapted to perform such numerical processing have been devised. However, these simulators require an overwhelming amount of computation so as to increase the accuracy of the simulation, which may decrease simulation versatility. Therefore, the important question is how to build reliable and versatile simulators.

In the field of engineering which deals with the behavior of a physical system such as an industrial plant or a robot, it is an important problem to estimate the behavior of the physical system and control it on the basis of observed data from sensors. This estimation is generally performed by a numerical simulation using a simulator.

The performance of a simulator affects the reliability of the result of a numerical simulation, which, in turn, determines the performance of a controller which controls the physical system. For this reason, various simulators have been developed so far according to the type of a physical system which is an object of numerical simulation and a reliability required of a controller.

A model of a physical system to be processed is derived on the basis of the laws of nature. In this case, the effect of random disturbance such as noise in many actual physical systems is often neglected so that they are idealized or simplified. Depending on the physical system, the effect of random disturbance sometimes cannot be neglected.

In designing a controller for an artificial satellite by way of example, it is impossible to neglect random disturbance such as radiation pressure of the sun, gravity, or collision with the wreck of another satellite drifting in space. With a controller for an industrial plant or robot, it is sometimes impossible to neglect random disturbance such as noise mixed in signals from sensors for observing a controlled object.

In a simulation that aims at analysis and control of a physical system which undergoes the effect of random disturbance, it is required to provide a physical model that reflects the random disturbance and to process it numerically.

In general, the model of any physical system can be represented by the ordinary differential equation:

$$\dot{x}=f(x,t),\ x(t_0)=x_0 \quad (1)$$

where $x=x(t)$ indicates a physical quantity for simulation, such as displacement, temperature or the like, in the physical system and varies with time t. $\dot{x}$ indicates differentiation of x with respect to t. $f(x, t)$ indicates a function of x and t, and $x_0$ is the initial value of x at time $t=t_0$.

In a numerical simulation for the physical model represented by equation (1), let the approximate value of physical quantity $x(t_n)$ at $t_n=t_0+nh$ be $x_n$. Then, the approximate value $x_{n+1}$ of the physical quantity $x(t_{n+1})$ at $t_{n+1}$ will be calculated by the equation:

$$x_{n+1}=x_n+\Psi(x_n, t_n, h) \quad (2)$$

Note that $x_0$ is not an approximate value but the initial value of x at time $t=t_0$. Here, h indicates a timing step size or an internal of the simulation and $\Psi(x_n, t_n, h)$ provides an increment (or a time increment) of the approximate value $x_n$ at $t_n$. How $\Psi(x_n, t_n, h)$ is to be set up with $x_n$, $t_n$ and h is so important as to affect the reliability of the result of numerical simulation.

Methods of setting up $\Psi(x_n, t_n, h)$ in equation (2) can be roughly classified into two methods: Taylor series method and Runge-Kutta method. The Taylor series method, which is in principle simple, provides $\Psi(x_n, t_n, h)$ by Taylor series terms up to the order required for simulation. With this method, however, the coefficient of the p-th order term generally will involve the p-th order derivative $\partial^p f(x, t)/\partial x^p$ of the function $f(x, t)$. If the function $f(x, t)$ is of a simple type, for example, a linear function of x, then that derivative will be obtained easily. If, however, $f(x, t)$ is a complex non-linear function, then it will be difficult to provide its high-order derivative as a function of x and t. With the Taylor series method, it is required for an operator to find derivatives of $f(x, t)$ and enter them into a simulator. Furthermore, the computation of derivatives is a heavy burden on a simulator. Thus, the Taylor series method is poor in versatility. In numerical simulation, therefore, the Runge-Kutta method is often used, which forms $\Psi(x_n, t_n, h)$ by the equation:

$$\Psi(x_n, t_n, h) = h \sum_{i=1}^{s} b_i k_i, \sum_{i=1}^{s} b_i = 1 \quad (3)$$

where s is a natural number, and $k_i$ (k parameter) is a value of function $f(x, t)$ which corresponds to appropriately chosen x and t. The k parameter $k_i$ is generated by the following computational processing.

$$\begin{cases} k_1 = f(x_n, t_n), \\ k_i = f\left(x_n + h \sum_{j=1}^{i-1} a_{ij} k_j, t_n + c_i h\right), \\ c_i = \sum_{j=1}^{i-1} a_{ij}, (i \geq 2) \end{cases} \quad (4)$$

According to equations (4), $k_i$ can be obtained explicitly using $k_1$ to $k_{i-1}$. Thus, this method is called an explicit Runge-Kutta method. In equations (3) and (4), the b parameter $b_i$ and the a parameter $a_{ij}$ are parameters indicating weights for the k parameters, which are stored in memories within a simulator. Depending on how b parameters and a parameters are chosen, the incremental value $\Psi(x_n, t_n, h)$ for the approximate value $x_n$ varies, which affects the accuracy of the approximate value $x_{n+1}$ and consequently determines the performance of the simulator.

With the method using k parameters, there is no need of providing any differential form of the coefficient function $f(x, t)$ in performing the numerical processing of equation (2). Therefore, this method is far more versatile than the Taylor series method.

Assuming the solution of equation (1) at time t=tn to be $x(t_n)$, a difference or error between the approximate value $x_n$ based on numerical simulation and $x(t_n)$ is given by $x(t_n)-x_n$. The smaller the error is, the higher the reliability of the results of simulation becomes. The timing step size h serves as a measure for estimating the magnitude of that error. When it is assured that the error is on the order of $h^{r+1}$, the simulator or the result of simulation is said to have an approximation accuracy of r order. The greater the value of r is, the higher the reliability of simulation becomes.

When a physical system to be simulated undergoes the effect of random disturbance such as noise, the physical model for that system is described using the following stochastic differential equation of Ito's type instead of equation (1).

$$\dot{x}(t)=f(x)+g(x)w(t), \quad x(t_0)=x_0 \qquad (5)$$

where $x=x(t)$ stands for the state quantity in the physical system to be simulated, $f(x)$ and $g(x)$ are each a function of x, and $w(t)$ represents a noise model the value of which depends on the stochastic process of a Brownian motion model. This model includes a second term associated with random disturbance added to the right-hand side of equation (1). $x_0$ is the initial value of x at time $t=t_0$.

Since equation (5), representing a physical model subjected to random disturbance, unlike equation (1), has an added term associated with random disturbance, $\Psi(x_n, t_n, h)$ in equations (3) and (4) cannot be used as it is. In order to handle the stochastic-process-dependent random disturbance term, it is required to expand $\Psi(x_n, t_n, h)$ in equations (3) and (4) to the case of a stochastic differential equation. Conventional methods of setting up the expanded an increment $\Psi(x_n, t_n, h)$ using k parameters include a stochastic Heun method, a 3-stage explicit method that assures 1.5 order accuracy, and an asymptotically efficient method.

The stochastic Heun method (RÜMELIN, SIAM J. Vol.19, No.3, June 1982) uses a stochastic-process-dependent term added to the right-hand side of equation (3) as $\Psi(x_n, t_n, h)$ for the physical model described by equation (5). This method is a direct expansion of equation (3) for a physical model subjected to stochastic-process-dependent random disturbance, assuring first order approximation accuracy. Unlike equation (3), this expansion is characterized in that the k parameters include a value of function $g(x)$ and a value of a first derivative of function $g(x)$.

The 3-stage explicit method (SAITO, MITSUI, Japan applied mathematics society journal Vol. 2, No. 1, 1992) further expands $\Psi(x_n, t_n, h)$ in the stochastic Heun method using two types of stochastic processes. In general, this method assures a high approximation accuracy of 1.5 order, and the k parameters include a value of a first derivative of each of functions $f(x)$ and $g(x)$ and a value of a second derivative of $g(x)$.

The asymptotically efficient method (NEWTON, SIAM J. Vol. 51, No. 2, April 1991) further adds a term relating to $(h)^{1/2}$ to $\Psi(x_n, t_n, h)$, thereby simplifying computational processing of the k parameters. With this method, the k parameters include no value of first derivative of function $g(x)$ and can be calculated by using values of $f(x)$ and $g(x)$. For this reason, this method is superior in simulation versatility. The approximation accuracy of this method is one order as in the case with the stochastic Heun method.

The numerical simulation based on the conventional time-increment forming methods have the following problems.

With the stochastic Heun method, in calculating the increment $\Psi(x_n, t_n, h)$ for the approximate value $x_n$, two sets of k parameters are calculated using the $x_n$ value already obtained, $t_n$ and h, and the k parameters are weighted suitably and then added. At this point, a calculation expression for a set of k parameters includes a first derivative of the function $g(x)$ describing random disturbance. In performing a numerical simulation, therefore, the value of the first derivative of the function $g(x)$ must be calculated. For this reason, as with the Taylor series method, the amount of calculation increases, increasing the load on the simulator. Thus, this method is not versatile. In addition, the approximation accuracy of the simulation remains at first order and hence the reliability of the simulation is not necessarily high.

The 3-stage explicit method is more reliable than the stochastic Heun method for simulation results. However, since the k-parameter calculating expression includes first derivatives of the functions $f(x)$ and $g(x)$ and a second derivative of $g(x)$, the function forms of those derivatives must be given. The necessity of not only the values of the first derivatives of $f(x)$ and $g(x)$ but also the value of the second derivative of $g(x)$ results in a significant increase in the amount of calculation in comparison with the stochastic Heun method. In practice, it is difficult to apply this method to simulators.

In comparison with the stochastic Heun method and the 3-stage explicit method, the asymptotically efficient method has an advantage that it does not require provision of derivatives of $g(x)$ and the like in performing a numerical simulation. With this method, the k-parameter calculation expression is described by the functions $f(x)$ and $g(x)$. Thus, this method permits numerical processing to be performed easily and is superior in versatility. However, the drawback of this method is low reliability because the approximation accuracy of simulation remains at first order.

To simulate a system subjected to the random-disturbance effect, it is essential to develop a simulator that finds numerically the solution of the stochastic differential equation described by equation (5). Nevertheless, few practical simulators have been developed so far because the conventional simulation methods have the above-described problems with respect to reliability and versatility.

SUMMARY OF THE INVENTION

It is an object of the present invention to provide a simulator and simulation method which, in numerical simulation of a system subjected to random disturbance, needs a smaller amount of computation, has increased versatility, and permits the accuracy of the simulation result to be increased.

The present invention describes a physical system suffering random disturbance by means of a function representing variations in a state quantity x with time t and random numbers and obtains an approximate value of x explicitly at every step of a simulation using an initial value of x.

The simulator of the present invention, which is a simulator in an information processor that performs numerical calculations, includes an initialization unit, an increment generating unit, an approximate value updating unit, and an output unit.

The initialization unit enters the function and the initial value of x which form initial data.

The increment generating unit generates first and second sequences of random numbers and then uses these random numbers and the simulation step size h to generate, as function values of the function given from the initialization unit, three or more types of k parameters from the initial value of x. And the increment generating unit generates an increment of x of the Runge-Kutta type using a term that is proportional to the square root of h but is not dependent on the first and second random numbers.

The approximate updating unit updates the approximate value of x using the increment generated by the increment generating unit and provides the updated approximate value to the output unit and the increment generating unit.

The increment generating unit further generates a sample state quantity using h, the first and second random numbers, first parameters, and the approximate value of x from the approximate value updating unit. The increment generating unit next generates the k parameters explicitly from the generated sample state quantity using the function entered from the initialization unit and then generates an increment of x using the k parameters, the first and second random numbers, h, and second parameters.

The output unit provides to the outside an approximate value of x at every simulation step from the approximate value updating unit as the result of the simulation.

By the use of two types of random numbers to generate an increment, the increment generating unit is permitted to contain higher order terms when the increment is expanded with respect to h than with a simulator arranged to generate an increment using only one type of random numbers The increment contains a term which is proportional to the square root of h and is random-number-independent, which eliminates the need of calculating values of derivatives of functions, f(x) and g(x), in equation (5).

The present invention permits highly accurate simulation results to be obtained with a small amount of computation. In particular, a simulator can be implemented which provides an accuracy as high as 1.5 order to the result of a simulation of a system suffering random disturbance.

DESCRIPTION OF THE PREFERRED EMBODIMENT

Figure 1:
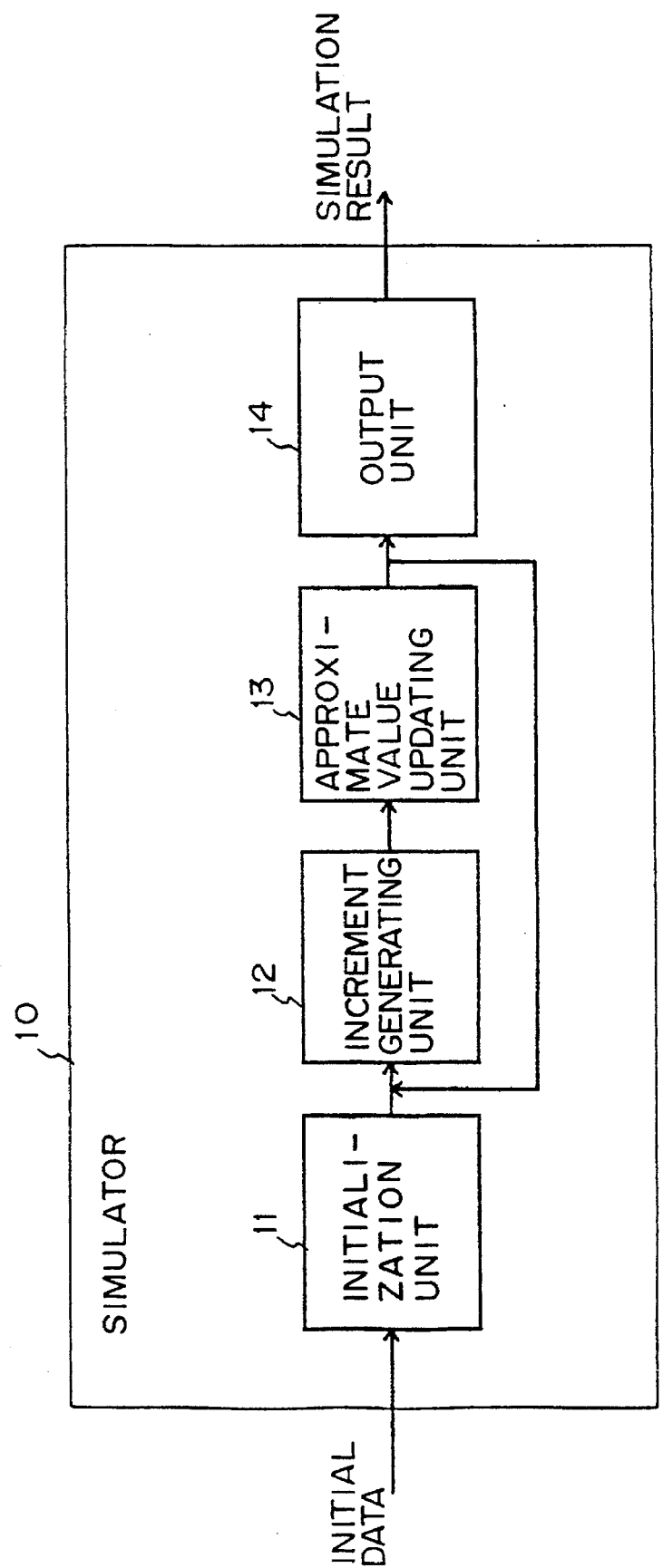
FIG. 1 is a block diagram of a simulator embodying the present invention.

Referring now to FIG. 1, there is illustrated a basic block diagram of a simulator 10 embodying the present invention, which describes a physical system subjected to random disturbance by the use of a function representing variations in a state quantity x with time and random numbers, obtains explicitly an approximate value of x from its initial value at every timing step, and outputs the simulation result.

The simulator 10 comprises an initialization unit 11, an increment generating unit 12, an approximate value updating unit 13, and an output unit 14. The initialization unit 11 enters into the increment generating unit 12 the above-mentioned function and initial value which are initial data.

The increment generating unit 12 generates first and second random numbers corresponding to the random numbers and then uses those random numbers and a timing step size h to generate three or more different types of k parameters from the initial value of x as values of the function entered from the initialization unit 11. Using a term that is proportional to the square root of h and is not dependent on the first and second random numbers, the increment generating unit 12 further generates a Runge-Kutta type increment of x from the generated k parameters.

The approximate value updating unit 13 updates the approximate value of x using the increment generated by the increment generating unit 12 and provides the updated approximate value to the output unit 14 and the increment generating unit 12.

The increment generating unit 12 further generates an increment for the updated approximate value from the approximate value updating unit 13 and provides it to the approximate value updating unit 13. The output unit 14 outputs the approximate value of x at every timing step from the approximate value updating unit 13 to the outside as the simulation result.

To further simplify the numerical processing, the increment generating unit 12 is equipped with a parameter generating unit, an increment generating unit, a first parameter storage unit, and a second parameter storage unit, which are all not shown in FIG. 1.

The first parameter storage unit stores first parameters for use in the parameter generating unit, and the second parameter storage unit stores second parameters for use in the increment generating unit.

The parameter generating unit generates a sample state quantity corresponding to the state quantity x using h, the first and second random numbers, the first parameter, and the approximate value of x. The parameter generating unit further generates the above k parameters from the generated sample state quantity using the given function and supplies them to the increment generating unit.

The time increment generating unit is responsive to the k parameters from the parameter generating unit, the first and second random numbers, h, and the second parameter to generate an increment of x.

The increment generating unit 12 generates an increment by use of two sequences of random numbers. When the increment is expanded with respect to h, therefore, it is allowed to include higher-order terms than in a simulator adapted to generate an increment by use of one sequence of random numbers.

Moreover, since the increment is proportional to the square root of h and includes a term which are not dependent on the two sequences of random numbers, the present invention avoids the need of calculating derivatives of the functions f(x) and g(x) in equation (5), making numerical processing easier than a simulator that does not use such a term. Furthermore, the present invention is provided with the parameter generating unit which generates the sample state quantity from an approximate value of x and then generates the k parameters from the generated sample state quantity, and the increment generating unit which generates an increment from the k parameters, thereby enabling numerical processing to be performed step by step.

In the present embodiment, consider the case where a physical model described in the form of equation (5) is simulated as a system subjected to random disturbance. Here, the state quantity x(t) is generally a d-dimensional quantity, and equation (5) corresponds to a mathematical model that describes a d-dimensional stochastic differential equation.

In the simulator of the present embodiment, an approximate value, $\bar{x}_n$ (hereinafter referred to as $x_n$ bar), of x(t) at time $t_n=t_0+nh$ and an approximate value, $\bar{x}_{n+1}$ (hereinafter referred to as $x_{n+1}$ bar), of x(t) at time $t_{n+1}=t_0+(n+1)h$ are related by the question:

$$\bar{x}_{n+1} = \bar{x}_n + \Psi(\bar{x}_n, t_n, h) \quad (6)$$

In equation (6), $\Psi(x_n$ bar, $t_n$, h) represents an increment for the approximate value, $x_n$ bar, of x(t) at time $t=t_n$. Each of $x_n$ bar, $x_{n+1}$ bar, and $\Psi(x_n$ bar, $t_n$, h) also has a d-dimensional value.

Figure 2:
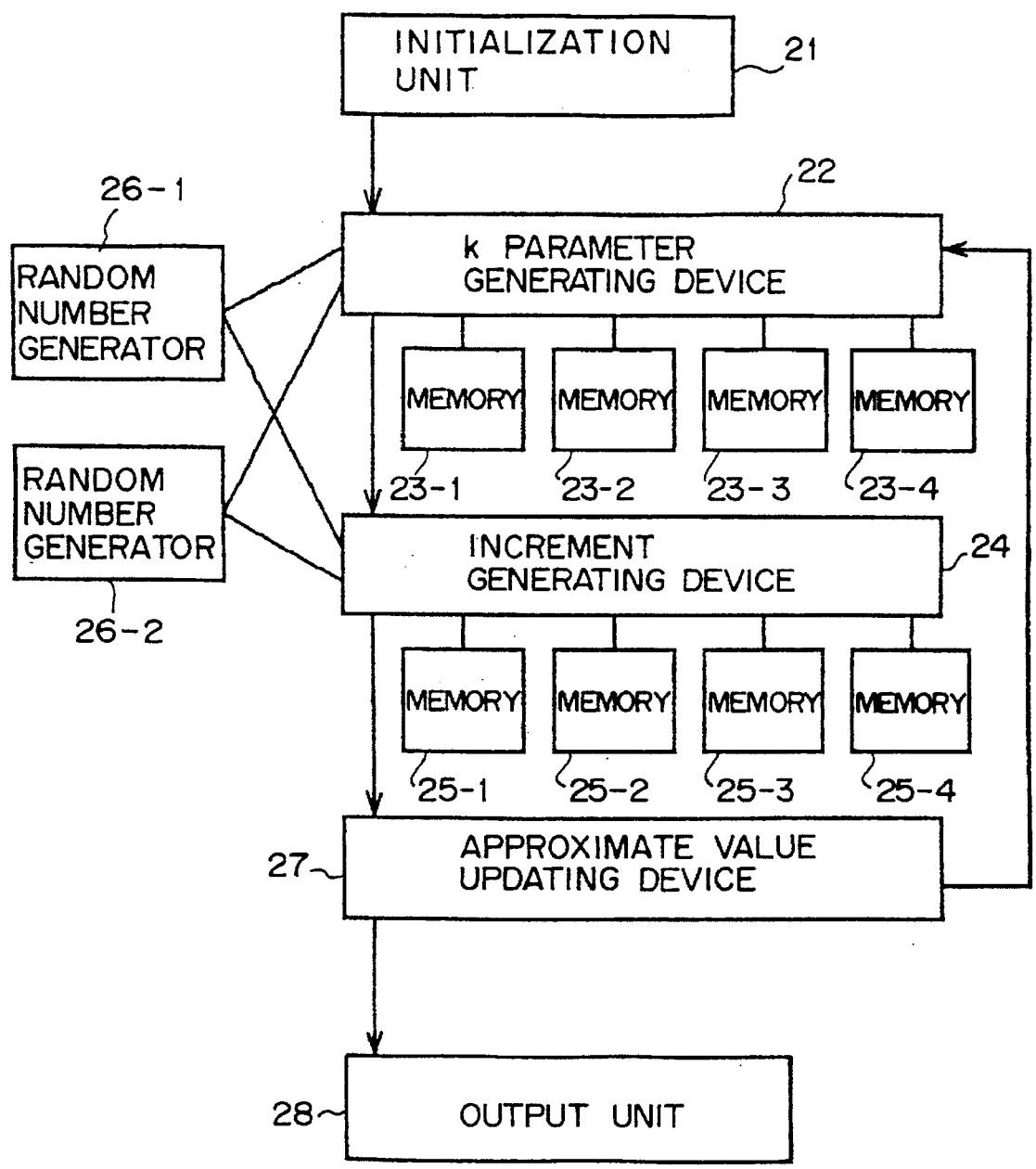
FIG. 2 is a more detailed block diagram of the simulator of FIG. 1.

FIG. 2 is a more-detailed block diagram of the simulator of FIG. 1. In FIG. 2, an initialization unit 21 corresponds to the initialization unit 11 of FIG. 1, which enters specific function forms of f(x) and g(x) in equation (5) and the initial value $x_0=x(t_0)$ of x at time $t=t_0$ as externally applied initial data into a k parameter generating device 22.

The k parameter generating device 22, time increment generating device 24, memories 23-1, 23-2, 23-3 and 23-4, and memories 25-1, 25-2, 25-3 and 25-4 correspond to the parameter generating unit, the increment generating unit, the first parameter storage unit, and the second parameter storage unit, respectively. These devices, together with random number generators 26-1 and 26-2, construct the increment generating unit 12.

The random number generators 26-1 and 26-2 generate a first sequence of random numbers and a second sequence of random numbers, respectively.

The k parameter generating device 22 and the increment generating device 24 are responsive to an input from the initialization unit 21 or an approximate value updating device 27 to generate the increment, $\Psi(x_n$ bar, $t_n$, h), for the approximate value, $x_n$ bar, of x(t) at time $t_n$, which is then entered into the approximate value updating device 27.

The approximate value updating device 27, which corresponds to the approximate value updating unit 13 of FIG. 1, adds the increment $\Psi(x_n$ bar, $t_n$, h) input from the increment generating device 24 to the approximate value $x_n$ bar to produce $x_{n+1}$ bar and provide it to the k parameter generating device 22 and the output unit 28.

The output unit 28, which corresponds to the output unit 14 of FIG. 1, outputs approximate values of x(t) which are sequentially supplied from the approximate value updating device 27 as the simulation result to the outside.

In order to perform numerical processing on the second term in the right-hand side of equation (5), g(x)w(t), that describes random disturbance so that it will be reflected in the approximate value $x_n$ bar, the simulator of FIG. 2 introduces four k parameters and generates the increment $\Psi(x_n$ bar, $t_n$, h) by the equations:

$$\Psi(\bar{x}_n, t_n, h) = h \sum_{i=1}^{s} b_i k_i + \Delta W_{n+1} \sum_{i=1}^{s} \bar{b}_i \bar{k}_i + \quad (7)$$

$$\frac{1}{\sqrt{3}} \Delta \tilde{W}_{n+1} \sum_{i=1}^{s} \tilde{b}_i \tilde{k}_i + \sqrt{vh} \sum_{i=1}^{s} \hat{b}_i \hat{k}_i$$

$$k_1 = f(\bar{x}_n), k_i = f\left(\bar{x}_n + h \sum_{j=1}^{i-1} a_{ij} k_j + \Delta W_{n+1} \sum_{j=1}^{i-1} \bar{a}_{ij} \bar{k}_j + \right. \quad (8)$$

-continued $$\left. \frac{\Delta \tilde{W}_{n+1}}{\sqrt{3}} \sum_{j=1}^{i-1} \tilde{a}_{ij} \tilde{k}_j \right) \quad (i \geq 2)$$

$$\bar{k}_1 = g(\bar{x}_n), \bar{k}_i = g\left(\bar{x}_n + h \sum_{j=1}^{i-1} a_{ij} k_j + \Delta W_{n+1} \sum_{j=1}^{i-1} \bar{a}_{ij} \bar{k}_j + \right. \quad (9)$$

$$\left. \sqrt{vh} \sum_{j=1}^{i-1} \hat{a}_{ij} \hat{k}_j \right) \quad (i \geq 2)$$

$$\tilde{k}_1 = g(\bar{x}_n), \tilde{k}_i = g\left(\bar{x}_n + h \sum_{j=1}^{i-1} a_{ij} k_j + \sqrt{vh} \sum_{j=1}^{i-1} \hat{a}_{ij} \hat{k}_j \right) \quad (i \geq 2) \quad (10)$$

$$\hat{k}_1 = g(\bar{x}_n), \hat{k}_i = g\left(\bar{x}_n + \sqrt{vh} \sum_{j=1}^{i-1} \hat{a}_{ij} \hat{k}_j \right) \quad (i \geq 2) \quad (11)$$

The first term in the right-hand side in equation (7) is similar to the Runge-Kutta method for an ordinary differential equation. The third and fourth terms are needed to solve equation (5) with an accuracy of 1.5 order or more. Here, the parameters $\Delta W_{n+1}$ and $\Delta \bar{W}_{n+1}$ (hereinafter referred to as $\Delta W_{n+1}$ tilde) are respectively given by $\Delta W_{n+1} = \xi_{n+1} (h)^{1/2}$ and $\Delta W_{n+1}$ tilde=$\xi_{n+1}$ tilde$(h)^{1/2}$ where $\xi_{n+1}$ and $\xi_{n+1}$ tilde are samples of normal random numbers with mean 0 and variance 1 at time $t_n$. The samples $\xi_{n+1}$ and $\xi_{n+1}$ tilde correspond to the first and the second random numbers, respectively, which are generated independently by the random number generators 26-1 and 26-2 each time the approximate value $x_n$ bar is updated.

The fourth term in the right-hand side of equation (7) is not dependent on values of the samples $\xi_{n+1}$ and $\xi_{n+1}$ tilde and is proportional to $(h)^{1/2}$. The presence of the third and fourth terms permits a high accuracy of approximation to be effected without using derivatives of the functions f(x) and g(x). Therefore, those terms are needed so as to facilitate numerical processing and increase simulator versatility. Here, v is an appropriate positive real number.

In equation (7), the b parameters, $b_i$, $\bar{b}_i$ ($b_i$ bar), $\tilde{b}_i$ ($b_i$ tilde) and $\hat{b}_i$ ($b_i$ hat) (i=1, 2, . . . , s), are parameters used, in generating the increment, for weighting the k parameters, $k_i$, $\bar{k}_i$ ($k_i$ bar), $\tilde{k}_i$ ($k_i$ tilde) and $\hat{k}_i$ ($k_i$ hat), respectively. The b parameters correspond to the second parameters and are respectively stored in memories 25-1, 25-2, 25-3 and 25-4 beforehand.

The k parameter $k_i$ (i=1, 2, . . . , s) is a value of function f(x) given by equation (8) for the approximate value $x_n$ bar. The k parameters, $k_i$ bar, $k_i$ tilde, and $k_i$ hat (i=1, . . . , s), are values of function g(x) given by equations (9), (10) and (11). These four types of k parameters are generated by the k parameter generating device 22.

The a parameters $a_{ij}$, $\bar{a}_{ij}$ ($a_{ij}$ bar), $\tilde{a}_{ij}$ ($a_{ij}$ tilde) and $\hat{a}_{ij}$ ($a_{ij}$ hat) (i=1, . . . , s), in equations (8), (9), (10) and (11) are used to weight the k parameters, $k_i$, $k_i$ bar, $k_i$ tilde, and $k_i$ hat, in generating the k parameters and stored in memories 23-1, 23-2, 23-3 and 23-4 beforehand. These a parameters correspond to the first parameters.

The four types of k parameters, $k_i$, $k_i$ bar, $k_i$ tilde, and $k_i$ hat, are explicitly obtained from equations (8), (9), (10), and (11). To simplify the form, four types of k parameters are introduced into equation (7). However, only three types of k parameters may be used to generate an increment.

Next, how to determine the a and b parameters will be described.

In general, in order to assure r-order approximation accuracy to an approximate solution, $x_n$ bar, of equation (5) by the Runge-Kutta method, it is required to perform Taylor expansion on the solution $x(t_{n+1})$ at time $t_{n+1}$ with respect to h around the solution $x(t_n)$ at time $t_n$ and determine an increment $\Psi(x_n$ bar, $t_n$, h) so that terms up to the r-th order of h in $x_{n+1}$ bar may agree with ones in the expanded $x(t_{n+1})$.

In order to assure 1.5-order approximation accuracy to an approximate solution $\bar{x}_n$ of equation (5), the present simulator will use the Taylor expansion including terms up to 1.5-order of h. It is known that the Taylor expansion of the solution $x(t_{n+1})$ of equation (5) at time $t_{n+1}$ around $x(t_n)$ is described by the following equation (Ito, Applied Math and Optimization, Vol. 1, 1975).

$$x(t_{n+1}) = x(t_n) + g(x(t_n))\Delta W_{n+1} + \quad (12)$$

$$f(x(t_n))h + [Gg](x(t_n))\frac{\Delta W_{n+1}^2 - h}{2} +$$

$$([Fg](x(t_n)) + [Gf](x(t_n)))\frac{\Delta W_{n+1}}{2}h +$$

$$([Gf](x(t_n)) - [Fg](x(t_n)))\Delta \tilde{W}_{n+1}\frac{h}{2\sqrt{3}} +$$

$$[G^2g](x(t_n))\frac{\Delta W_{n+1}^3 - 3\Delta W_{n+1}h}{6} + O(h^2)$$

F and G in equation (12) are d-dimensional differential operators which are defined by the equations:

$$F(\cdot) = \sum_{j=1}^{d} f_j \frac{\partial}{\partial x_j}(\cdot) + \frac{1}{2}\sum_{j,k=1}^{d} g_j g_k \frac{\partial^2}{\partial x_j \partial x_k}(\cdot) \quad G(\cdot) = \sum_{j=1}^{d} g_j \frac{\partial}{\partial x_j}(\cdot) \quad (13)$$

$\Delta W_{n+1}$ and $\Delta \tilde{W}_{n+1}$ tilde in equation (12) each represent an increment of an independent Brownian motion model. Like $\Delta W_{n+1}$ and $\Delta W_{n+1}$ tilde in equation (7), using normal random number samples $\xi_{n+1}$ and $\tilde{\xi}_{n+1}$ tilde they are defined such that $\Delta W_{n+1} = \xi_{n+1}(h)^{1/2}$ and $\Delta W_{n+1}$ tilde $= \tilde{\xi}_{n+1}$ tilde $(h)^{1/2}$. $O(h^2)$ represents second or higher order terms of h.

Here, if the right-hand side of equation (6) that provides the approximate value $\bar{x}_{n+1}$ bar at time $t_{n+1}$ is Taylor expanded with respect to h around the approximate value $\bar{x}_n$ bar and the coefficients of the respective terms up to 1.5 order of h are compared with the coefficients of the respective terms in equation (12), then constraints on the a parameters and the b parameters will be obtained. At this point, the presence of the third and fourth terms in the right-hand side of equation (7) allows other terms than $O(h^2)$ in the right-hand side of equation (12) to be obtained without using derivatives of the functions f(x) and g(x). The constraints thus obtained are represented as follows.

$$\sum_{i=1}^{s} b_i = 1 \quad (14.1)$$

$$\sum_{i=1}^{s} \bar{b}_i \bar{c}_i = \frac{1}{2} \quad (14.2)$$

$$\sum_{i=1}^{s} \bar{b}_i \hat{c}_i = \frac{1}{2}v \quad (14.3)$$

$$\sum_{i=1}^{s} \bar{b}_i = 1 \quad (14.4)$$

$$\sum_{i=1}^{s} \bar{b}_i \bar{c}_i^2 = \frac{1}{3} \quad (14.5)$$

$$\sum_{i=1}^{s} \bar{b}_i \hat{c}_i^2 = \frac{1}{2}v \quad (14.6)$$

$$\sum_{i,j=1}^{s} \bar{b}_i \bar{a}_{ij} \bar{c}_j = \frac{1}{6} \quad (14.7)$$

$$\sum_{i,j=1}^{s} \bar{b}_i \hat{a}_{ij} \hat{c}_j = \frac{1}{2}v \quad (14.8)$$

$$\sum_{i=1}^{s} \tilde{b}_i \tilde{c}_i = \frac{1}{2} \quad (14.9)$$

$$\sum_{i=1}^{s} \tilde{b}_i \bar{c}_i = \frac{1}{2} \quad (14.10)$$

$$\sum_{i=1}^{s} \tilde{b}_i \tilde{c}_i = \frac{1}{2} \quad (14.11)$$

$$\sum_{i=1}^{s} \tilde{b}_i c_i = \frac{1}{2} \quad (14.12)$$

$$\sum_{i=1}^{s} \tilde{b}_i \hat{c}_i^2 = -\frac{1}{2}v \quad (14.13)$$

$$\sum_{i,j=1}^{s} \tilde{b}_i \bar{a}_{ij} \hat{c}_j = 0 \quad (14.14)$$

$$\sum_{i=1}^{s} \tilde{b}_i \hat{c}_i = 0 \quad (14.15)$$

$$\sum_{i=1}^{s} \tilde{b}_i \bar{c}_i \hat{c}_i = 0 \quad (14.16)$$

$$\sum_{i=1}^{s} \hat{b}_i = 0 \quad (14.17)$$

$$\sum_{i=1}^{s} \hat{b}_i \hat{c}_i = 0 \quad (14.18)$$

$$\sum_{i,j=1}^{s} \hat{b}_i \bar{a}_{ij} \hat{c}_j = 0 \quad (14.19)$$

$$\sum_{i=1}^{s} \hat{b}_i = 0 \quad (14.20)$$

$$\sum_{i,j=1}^{s} \hat{b}_i \hat{a}_{ij} \hat{c}_j = 0 \quad (14.21)$$

$$\sum_{i=1}^{s} \hat{b}_i \hat{c}_i^2 = 0 \quad (14.22)$$

In the above equations, $c_i$, $\bar{c}_i$ ($c_i$ bar), $\tilde{c}_i$ ($c_i$ tilde) and $\hat{c}_i$ ($c_i$ hat) are defined, using the corresponding a parameters, by the equations:

$$c_i = \sum_{j=1}^{i-1} a_{ij}$$

$$\bar{c}_i = \sum_{j=1}^{i-1} \bar{a}_{ij}$$

$$\tilde{c}_i = \sum_{j=1}^{i-1} \tilde{a}_{ij}$$

$$\hat{c}_i = \sum_{j=1}^{i-1} \hat{a}_{ij}, (i=1, \ldots, s) \quad (15)$$

In view of the fact that there are 22 constraints (14.1) through (14.22) on the a and b parameters, if s is selected to be s=4, then the total number of the a and b parameters required for simulation will be 40. For simplicity, assume here that $b_i = \bar{b}_i$ bar, $a_{ij} = \bar{a}_{ij}$ bar, $c_i = \tilde{c}_i$ tilde, $b_3$ tilde=$b_3$ hat, and $b_4$ tilde=$b_4$ hat. Then, the total number of the parameters will become 25. In this case, equations (14.1) and (14.4) become equivalent, equations (14.2), (14.9), (14.10) and (14.11) become equivalent, and equations (14.19) and (14.21) become equivalent. This causes the number of the constraints to be decreased from 22 to 17. In determining the a and b parameters, therefore, it is required that eight parameters be selected to be free parameters and v be set to an appropriate value.

As an example, assume that $a_{31}$ tilde=$a_{41}$ tilde= $a_{42}$ tilde=0, $a_{32}$=¼, $a_{43}$ hat=⅙, $c_2$=½, $c_4$=1, $c_4$ hat=0, and v=3. If these parameters are substituted into algebraic equations representing the 17 constraints to obtain the other independent parameters, then the a and b parameters to be stored in the corresponding respective memories will be determined as follows.

MEMORY 25-1

$b_1$=⅙, $b_2$=-⅔, $b_3$=⅗, $b_4$=⅙

MEMORY 25-2

$\bar{b}_1$=⅙, $\bar{b}_2$=-⅔, $\bar{b}_3$=⅗, $\bar{b}_4$=⅙

MEMORY 25-3

$\tilde{b}_1$=⅙, $\tilde{b}_2$=-⅔, $\tilde{b}_3$=⅗, $\tilde{b}_4$=-⅚

MEMORY 25-4

$\hat{b}_1$=0, $\hat{b}_2$'=-1/18, $\hat{b}_3$=⅝, $\hat{b}_4$=-⅚ (16.1)

MEMORY 23-1

$a_{21}$=½

$a_{31}$=¼, $a_{32}$=¼

$a_{41}$=⅓, $a_{42}$=-2, $a_{43}$=⅔

MEMORY 23-2

$\bar{a}_{21}=\frac{1}{2}$, $\bar{a}_{31}=\frac{1}{4}$, $\bar{a}_{32}=\frac{1}{4}$ $\bar{a}_{41}=\frac{1}{3}$, $\bar{a}_{42}=-2$, $\bar{a}_{43}=\frac{8}{3}$

MEMORY 23-3

$\tilde{a}_{21}=\frac{1}{2}$, $\tilde{a}_{31}=0$, $\tilde{a}_{32}=\frac{1}{2}$, $\tilde{a}_{41}=0$, $\tilde{a}_{42}=0$, $\tilde{a}_{43}=1$

MEMORY 23-4

$\hat{a}_{21}=-1$, $\hat{a}_{31}=-13/32$, $\hat{a}_{32}=5/32$, $\hat{a}_{41}=-7/24$, $\hat{a}_{42}=1/8$, $\hat{a}_{43}=1/6$ (16.2)

By substituting the values of the b parameters in (16.1) and v=3 into equation (7), the increment is written as follows.

$$\Psi(\bar{x}_n, t_n, h) = \left(\frac{1}{6} k_1 - \frac{2}{9} k_2 + \frac{8}{9} k_3 + \frac{1}{6} k_4\right) h + \quad (17)$$

$$\left(\frac{1}{6} \bar{k}_1 - \frac{2}{9} \bar{k}_2 + \frac{8}{9} \bar{k}_3 + \frac{1}{6} \bar{k}_4\right) \Delta W_{n+1} +$$

$$\frac{1}{\sqrt{3}} \left(\frac{1}{6} \tilde{k}_1 - \frac{2}{9} \tilde{k}_2 + \frac{8}{9} \tilde{k}_3 - \frac{5}{6} \tilde{k}_4\right) \Delta \tilde{W}_{n+1} +$$

$$\left(-\frac{1}{18} \hat{k}_2 + \frac{8}{9} \hat{k}_3 - \frac{5}{6} \hat{k}_4\right) \sqrt{3h}$$

By substituting the values of the a parameters in (16.2) and v=3 into equations (8) through (11), the k parameters are given by the equations:

$$k_1 = f(\bar{x}_n) \quad (18.1)$$

$$\bar{k}_1 = \tilde{k}_1 = \hat{k}_1 = g(\bar{x}_n)$$

$$k_2 = f\left(\bar{x}_n + \frac{1}{2} k_1 h + \frac{1}{2} \bar{k}_1 \Delta W_{n+1} + \frac{1}{2\sqrt{3}} \tilde{k}_1 \Delta \tilde{W}_{n+1}\right)$$

$$\bar{k}_2 = g\left(\bar{x}_n + \frac{1}{2} k_1 h + \frac{1}{2} \bar{k}_1 \Delta W_{n+1} - \hat{k}_1 \sqrt{3h}\right)$$

$$\tilde{k}_2 = g\left(\bar{x}_n + \frac{1}{2} k_1 h - \hat{k}_1 \sqrt{3h}\right)$$

$$\hat{k}_2 = g(\bar{x}_n - \hat{k}_1 \sqrt{3h})$$

$$k_3 = f\left(\bar{x}_n + \left(\frac{1}{4} k_1 + \frac{1}{4} k_2\right) h + \right. \quad (18.2)$$

$$\left(\frac{1}{4} \bar{k}_1 + \frac{1}{4} \bar{k}_2\right) \Delta W_{n+1} + \frac{1}{2\sqrt{3}} \tilde{k}_2 \Delta \tilde{W}_{n+1}\right)$$

$$\bar{k}_3 = g\left(\bar{x}_n + \left(\frac{1}{4} k_1 + \frac{1}{4} k_2\right) h + \left(\frac{1}{4} \bar{k}_1 + \frac{1}{4} \bar{k}_2\right)\right.$$

$$\left. \Delta W_{n+1} + \left(-\frac{13}{32} \hat{k}_1 + \frac{5}{32} \hat{k}_2\right) \sqrt{3h}\right)$$

$$\tilde{k}_3 = g\left(\bar{x}_n + \left(\frac{1}{4} \tilde{k}_1 + \frac{1}{4} \tilde{k}_2\right) h + \left(-\frac{13}{32} \hat{k}_1 + \frac{5}{32} \hat{k}_2\right) \sqrt{3h}\right)$$

$$\hat{k}_3 = g\left(\bar{x}_n + \left(-\frac{13}{32} \hat{k}_1 + \frac{5}{32} \hat{k}_2\right) \sqrt{3h}\right)$$

$$k_4 = f\left(\bar{x}_n + \left(\frac{1}{3} k_1 - 2 k_2 + \frac{8}{3} k_3\right) h + \right.$$

$$\left.\left(\frac{1}{3} \bar{k}_1 - 2 \bar{k}_2 + \frac{8}{3} \bar{k}_3\right) \Delta W_{n+1} + \frac{1}{\sqrt{3}} \tilde{k}_3 \Delta \tilde{W}_{n+1}\right)$$

$$\bar{k}_4 = g\left(\bar{x}_n + \left(\frac{1}{3} k_1 - 2 k_2 + \frac{8}{3} k_3\right) h + \right.$$

$$\left(\frac{1}{3} \bar{k}_1 - 2 \bar{k}_2 + \frac{8}{3} \bar{k}_3\right) \Delta W_{n+1} +$$

$$\left.\left(-\frac{7}{24} \hat{k}_1 + \frac{1}{8} \hat{k}_2 + \frac{1}{6} \hat{k}_3\right) \sqrt{3h}\right)$$

$$\tilde{k}_4 = g\left(\bar{x}_n + \left(\frac{1}{3} \tilde{k}_1 - 2 \tilde{k}_2 + \frac{8}{3} \tilde{k}_3\right) h + \right.$$

$$\left.\left(-\frac{7}{24} \hat{k}_1 + \frac{1}{8} \hat{k}_2 + \frac{1}{6} \hat{k}_3\right) \sqrt{3h}\right)$$

$$\hat{k}_4 = g\left(\bar{x}_n + \left(-\frac{7}{24} \hat{k}_1 + \frac{1}{8} \hat{k}_2 + \frac{1}{6} \hat{k}_3\right) \sqrt{3h}\right)$$

The approximate value, $x_{n+1}$ bar, produced by equations (6), (17), (18.1) and (18.2) agrees with the Taylor expansion on the right-hand side of equation (12) up to the 1.5-order term with respect to h, thereby assuring 1.5-order accuracy of the approximation. In addition, there is no need for derivatives of the functions f(x) and g(x). This eliminates the need for an operator to obtain functional forms of these derivatives and helps to decrease the amount of calculation required to obtain an approximate value.

Figure 3:
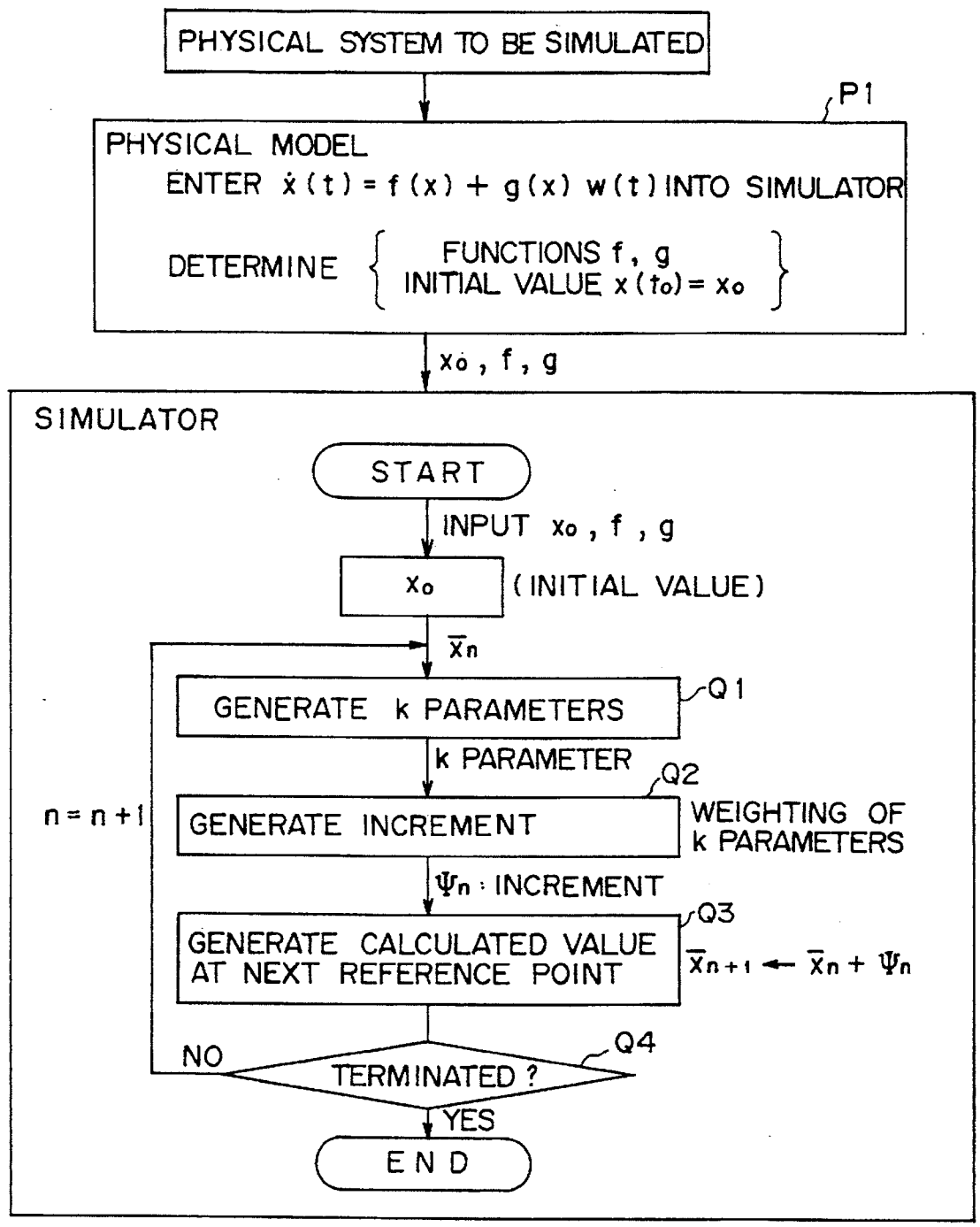
FIG. 3 is a flowchart illustrating the operation of the simulator of FIG. 2.

FIG. 3 is a flowchart illustrating an outline of the operation of the simulator of FIG. 2.

When a physical system that is a simulation object, is given, an operator determines a physical model describing that physical system and its initial state in preprocessing step P1. The physical model and the initial state correspond to equation (5). The functional forms of functions f(x) and g(x) and the initial value $x_0=x(t_0)$ of x are entered into the simulator as initial data.

In the simulator, the initialization unit 21 enters the initial data into the k parameter generating device 22. At this point, $x_0$ bar and $x_0$ are set such that $x_0$ bar=$x_0$.

In step Q1, the k parameter generating device 22 generates k parameters in sequence from the initial value $x_0$ using the a parameters stored in the memories 23-1 to 23-4 and samples, $\xi$n+1 and $\xi$n+1 tilde, of normal random numbers generated by the random number generators 26-1 and 26-2 after storage of the functional forms of f(x) and g(x). The k parameter generation processing is performed using equations (8) to (11) stored in the k parameter generating device 22. At this point it is supposed that n=0 and s= 4.

In step Q2, the increment generating device 24 generates an increment $\Psi(x_n$ bar, $t_n$, h) from the k parameters thus generated by the use of the b parameters stored in the memories 25-1 to 25-4 and the samples $\xi$n+1 and $\xi$n+1 tilde of the normal random numbers generated by the random number generators 26-1 and 26-2. This time increment generation processing is performed using equation (7) stored in the increment generating device 24. At this point it is supposed that n=0, s=4, and v=3.

In step Q3, the approximate value updating device 27 calculates $x_{n+1}$ bar at the next reference time $t_{n+1}$ from the generated time increment $\Psi(x_n$ bar, $t_n$, h) and $x_n$ bar using equation (6) stored therein and outputs it to the k parameter generating device 22 and the output unit 28. At this point it is supposed that n=0.

In step Q4, the approximate value updating device 27 determines if n corresponds to the simulation reference termination time. If an approximate value at the reference termination time has not been obtained yet, then n is incremented by one such that n=n+1. The process returns to step Q1 in which new k parameters are generated. Then, in step Q2, an increment $\Psi(x_n$ bar, $t_n$, h) is generated. Next, in step Q3, an approximate value $x_{n+1}$ bar at the next reference time is obtained. Subsequently, steps Q1 to Q4 are repeated. When it is determined in step Q4 that the last point of reference corresponding to the reference termination time has been reached, the process is terminated.

Figure 4:
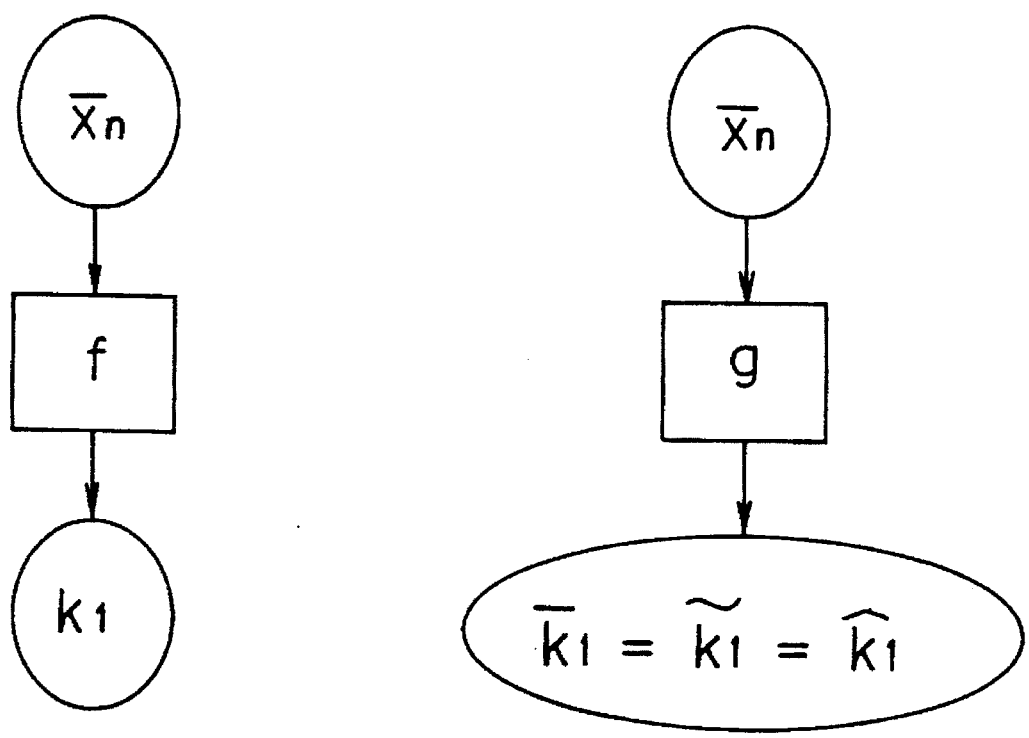
FIGS. 4, 5, 6 and 7 are flowcharts illustrating the operation of the k parameter generating device of FIG. 2.
Figure 5:
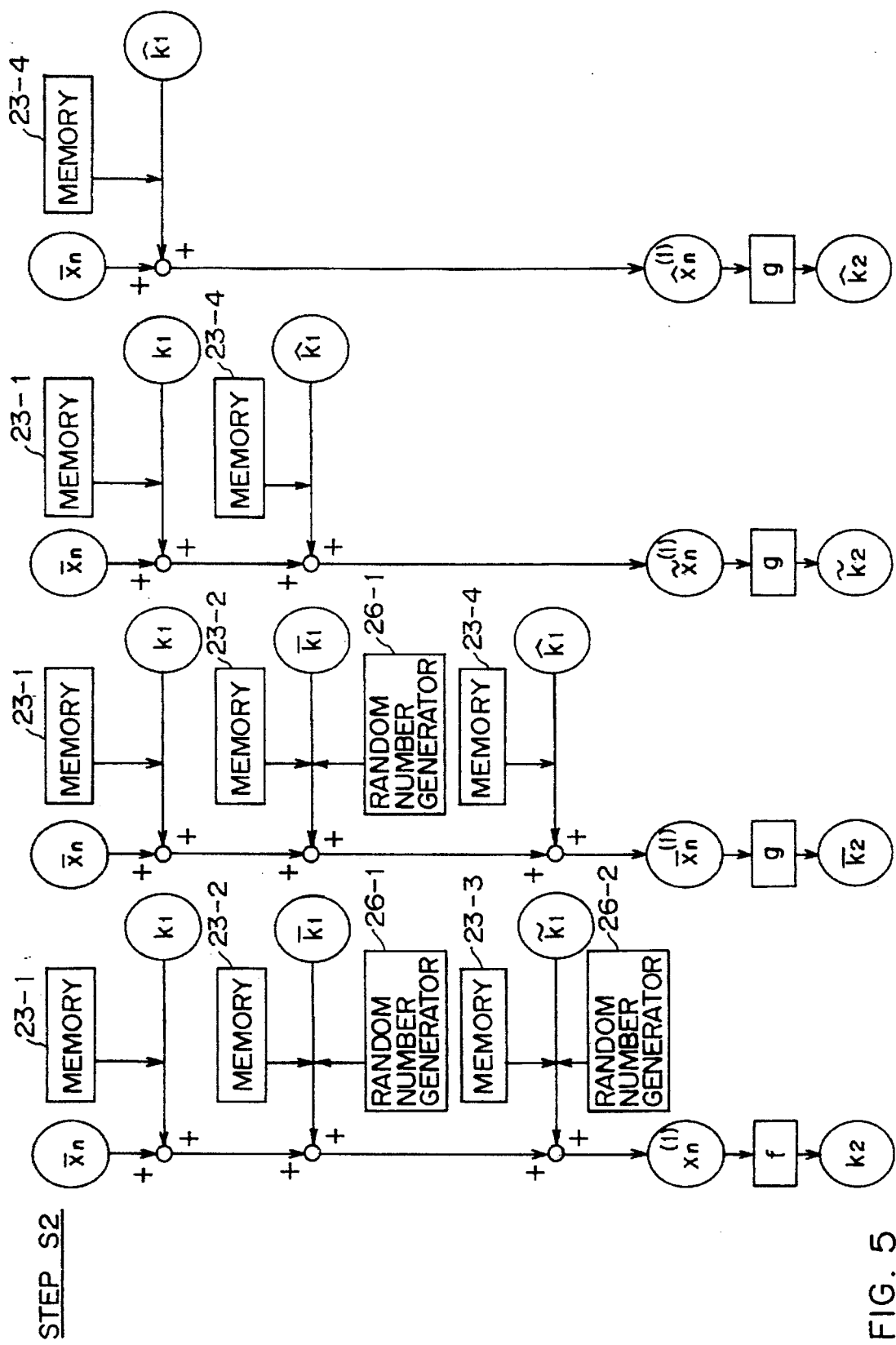
Figure 6:
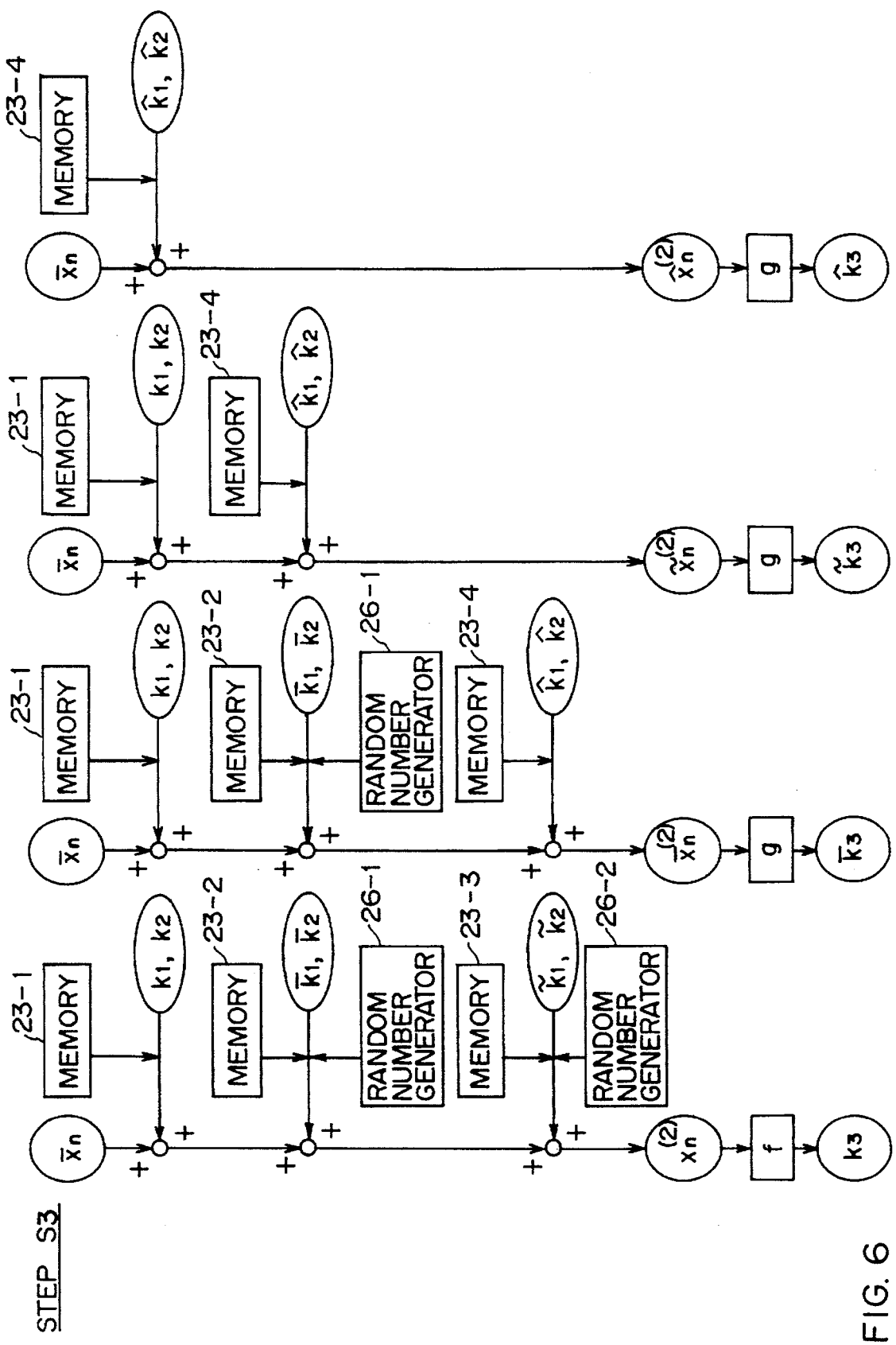
Figure 7:
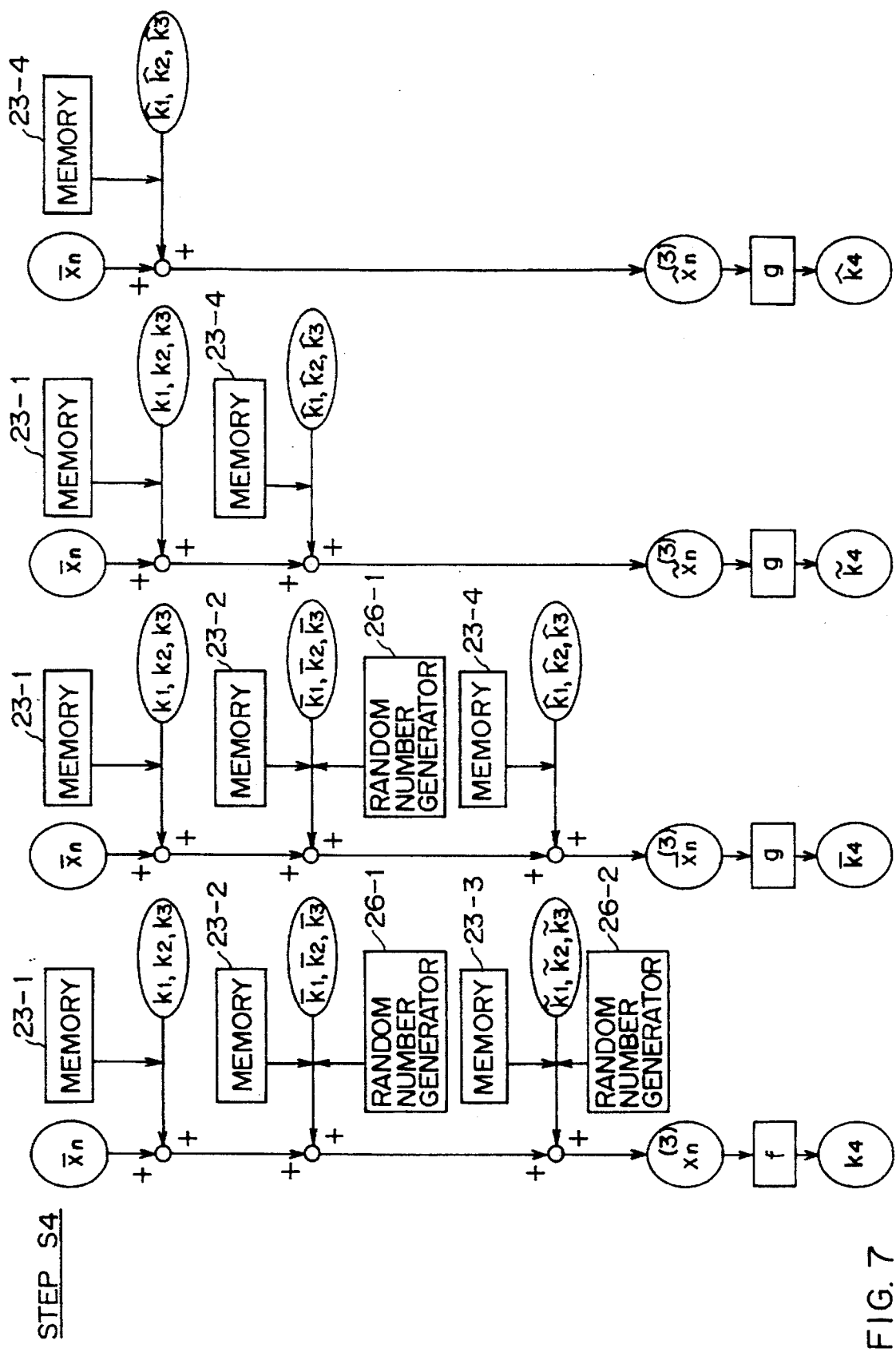

FIGS. 4 to 7 are flowcharts for the operation of the k parameter generating device 22 in step Q1 of FIG. 3. In FIGS. 5 to 7, $x_n^{(m)}$, $\bar{x}_n^{(m)}$ (hereinafter referred to as $x_n^{(m)}$ bar), $\tilde{x}_n^{(m)}$ ($x_n^{(m)}$ tilde) and $\hat{x}_n^{(m)}$ ($x_n^{(m)}$ hat) (m≧1) each represent a numerical value within parentheses that is transformed into a k parameter by f(x) or g(x) in equations (8), (9), (10), (11) where i≧2 and correspond to a sample state quantity. In this case, m=i−1. When i=1, $x_n$ bar corresponds to the sample state quantity.

First, in step S1 of FIG. 4, $x_n$ bar input from the initialization unit 21 or the approximate value updating device 27 is subjected to transformation using the functions f(x) and g(x), thereby generating parameters $k_1$, $k_1$ bar, $k_1$ tilde and $k_1$ hat. Since, in this case, $k_1$, $k_1$ bar, $k_1$ tilde and $k_1$ hat are equal in value to one another, the generation processing for these parameters has only to be performed once.

Next, in step S2 of FIG. 5, the parameters $k_2$, $k_2$ bar, $k_2$ tilde and $k_2$ hat are generated from the values of the $k_1$, $k_1$ bar, $k_1$ tilde and $k_1$ hat generated in step S1.

To generate the parameter $k_2$, first, $k_1$, $k_1$ bar and $k_1$ tilde are respectively multiplied by $a_{11}$, $a_{11}$ bar, and $a_{11}$ tilde stored in the memories 23-1, 23-2 and 23-3. Next, the second, third and fourth terms within parentheses in equation (8) are generated by the use of samples of normal random numbers generated by the random number generators 26-1 and 26-2, then added to $x_n$ bar in sequence, thereby generating $x_n^{(1)}$. Finally, the $x_n^{(1)}$ value thus obtained is transformed by use of the function f(x) to obtain a $k_2$ value.

To generate the parameter $k_2$ bar, first, $k_1$, $k_1$bar and $k_1$ tilde are respectively multiplied by $a_{11}$, $a_{11}$ bar, and $a_{11}$ tilde stored in the memories 23-1, 23-2 and 23-3. Next, the second, third and fourth terms within parentheses in equation (9) are generated by the use of a sample of normal random numbers generated by the random number generator 26-1, then added to $x_n$ bar in sequence, thereby generating $x_n^{(1)}$ bar. Finally, the $x_n^{(1)}$ bar value thus obtained is transformed by use of the function g(x) to obtain a $k_2$ bar value.

To generate the parameter $k_2$ tilde, first, $k_1$ and $k_1$ hat are respectively multiplied by $a_{11}$ and $a_{11}$ hat stored in the memories 23-1 and 23-4 to generate the second and third terms within parentheses of equation (10). The second and third terms thus obtained are added to $x_n$ bar in sequence to generate $x_n^{(1)}$ tilde. Next, the $x_n$ tilde value thus obtained is transformed using the function g(x), thereby obtaining a $k_2$ tilde value.

To generate the parameter $k_2$ hat, first, $k_1$ hat is multiplied by $a_{11}$ hat stored in the memory 23-4 to generate the second term within parentheses of equation (11). The second term thus obtained is added to $x_n$ bar to generate $x_n^{(1)}$ hat. Next, the $x_n$ tilde value thus obtained is transformed using the function g(x), thereby obtaining a $k_2$ hat value.

The processes of generating the parameters k3, k3 bar, $k_3$ tilde, $k_3$ hat, $k_4$, $k_4$ bar, $k_4$ tilde, and $k_4$ hat in FIGS. 6 and 7 are basically the same as those in FIG. 5.

In step S3 of FIG. 6, values of $x_n^{(2)}$, $x_n^{(2)}$ bar, $x_n^{(2)}$ tilde, and $x_n^{(2)}$ hat are obtained from the values of $k_1$, $k_1$ bar, $k_1$ tilde and $k_1$ hat generated in step S1 and the values of $k_2$, $k_2$ bar, $k_2$ tilde and $k_2$ hat generated in step S2 to generate parameters $k_3$, $k_3$ bar, $k_3$ tilde and $k_3$ hat.

In step S4 of FIG. 7, values of $x_n^{(3)}$, $x_n^{(3)}$ bar, $x_n^{(3)}$ tilde, and $x_n^{(3)}$ hat are obtained from the values of $k_1$, $k_1$ bar, $k_1$ tilde and $k_1$ hat generated in step S1, the values of $k_2$, $k_2$ bar, $k_2$ tilde and $k_2$ hat generated in step S2 and the values of $k_3$, $k_3$ bar, $k_3$ tilde and $k_3$ hat generated in step S3 to generate parameters $k_4$, $k_4$ bar, $k_4$ tilde and $k_4$ hat.

Figure 8:
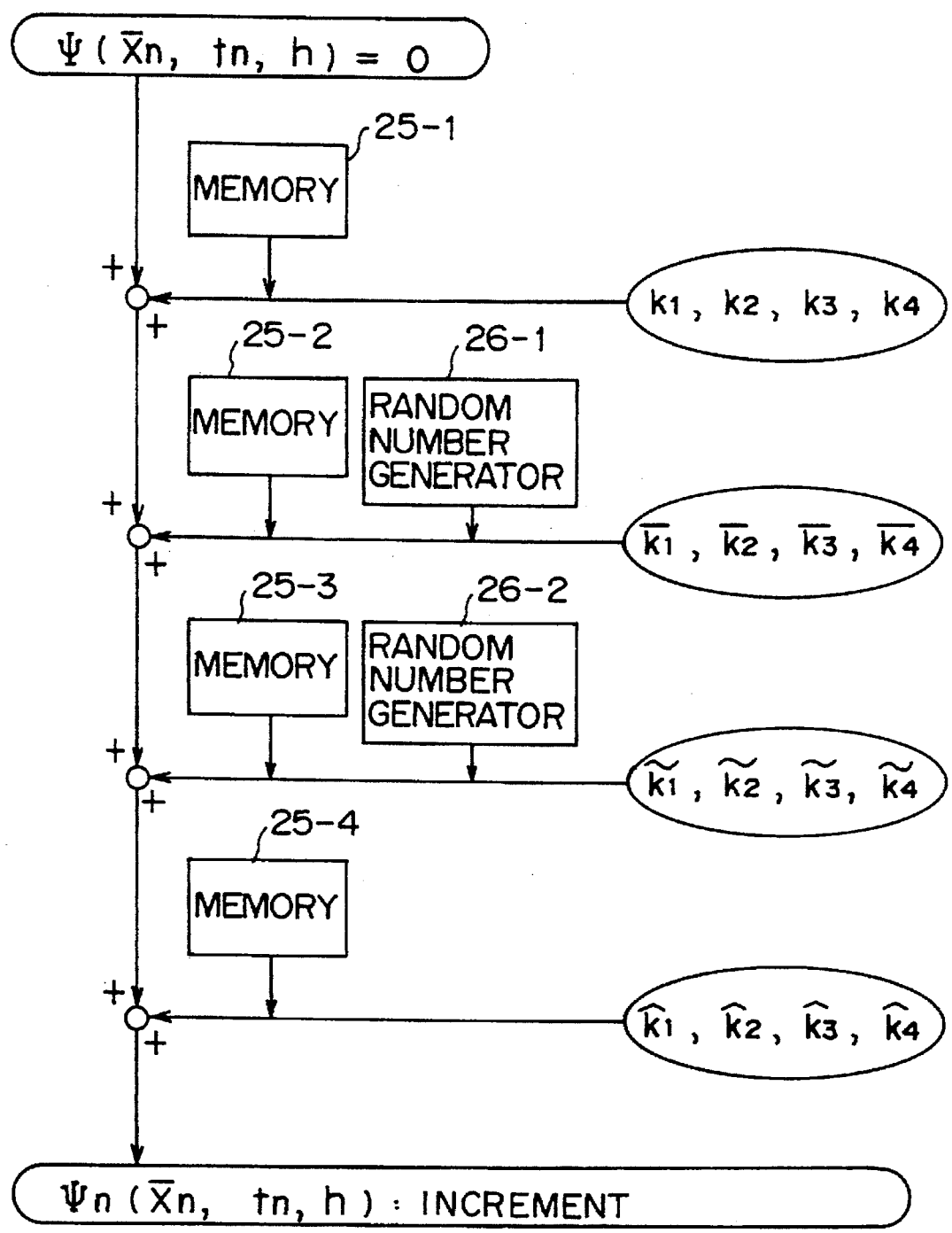
FIG. 8 is a flowchart illustrating the operation of the increment generating device of FIG. 2.

FIG. 8 is a flowchart for the detailed operation of the increment generating device 24. The time increment generating device 24 first sets the increment $\Psi(x_n$ bar, $t_n$, h) to zero.

Next, the increment generating device 24 respectively multiplies $k_1$, $k_2$, $k_3$ and $k_4$ from the k parameter generating device 22 by $b_1$, $b_2$, $b_3$ and $b_4$ which are b parameters stored in the memory 25-1, thereby generating the value of the first term on the right-hand side of equation (7). The value of the first term thus generated is added to $\Psi(x_n$ bar, $t_n$, h).

Next, the increment generating device 24 respectively multiplies $k_1$ bar, $k_2$ bar, $k_3$ bar and $k_4$ bar from the k parameter generating device 22 by $b_1$ bar, $b_2$ bar, $b_3$ bar and $b_4$ bar which are b parameters stored in the memory 25-2. Further, a sample of random numbers generated by the random number generator 26-1 is used to generate the value of the second term on the right-hand side of equation (7). The value of the second term thus generated is added to $\Psi(x_n$ bar, $t_n$, h).

Then, the increment generating device 24 respectively multiplies $k_1$ tilde, $k_2$ tilde, $k_3$ tilde and $k_4$ tilde from the k parameter generating device 22 by $b_1$ tilde, $b_2$ tilde, $b_3$ tilde and $b_4$ tilde which are b parameters stored in the memory 25-3. Further, a sample of random numbers generated by the random number generator 26-2 is used to generate the value of the third term on the right-hand side of equation (7).

The value of the third term thus generated is added to $\Psi(x_n$ bar, $t_n$, h).

Finally, the increment generating device 24 respectively multiplies $k_1$ hat, $k_2$ hat, $k_3$ hat and $k_4$ hat from the k parameter generating device 22 by $b_1$ hat, $b_2$ hat, $b_3$ hat and $b_4$ hat which are b parameters stored in the memory 25-4, thereby generating the value of the fourth term on the right-hand side of equation (7). The value of the fourth term thus generated is added to $\Psi(x_n$ bar, $t_n$, h).

The value of $\Psi(x_n$ bar, $t_n$, h) thus obtained corresponds to an increment to the approximate value $x_n$ bar at time $t_n$.

The approximate value updating device 27 adds the value of $\Psi(x_n$ bar, $t_n$, h) generated from the increment generating device 24 to the value of $x_n$ bar to thereby generate an approximate value, $x_{n+1}$ bar, of the state quantity $x(t_{n+1})$ at the next reference time $t_{n+1}$, which, in turn, is applied to the k parameter generating device 22 and the output unit 28.

The output unit 28 stores each of the approximate values at respective reference points of time from the approximate value updating device 27 and, on termination of the approximate value updating, provides these approximate values as the simulation result to an external display unit, a controller that controls a physical system to be simulated, or the like.

Here, a specific method of generating normal random numbers by the random number generators 26-1 and 26-2 will be explained. In general, a method is used in which uniform random numbers are generated, then transformed into normal random numbers. For example, uniform random numbers are generated by the use of the known congruence method by Lehmer, and these uniform random numbers can be transformed into normal random numbers by means of the known Box and Müllar method.

Next, description will be made of the result of a specific application of the simulator of the present embodiment to a physical system subjected to random disturbance. In the specific application, normal random numbers were generated by means of the Lehmer method and the Box and Müllar method.

Figure 9:
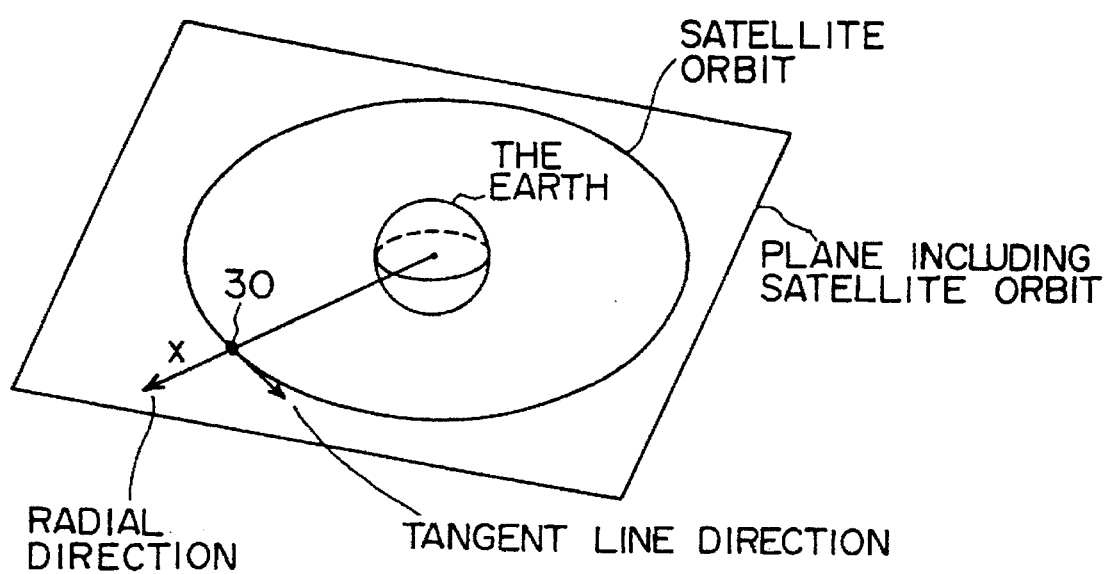
FIG. 9 illustrates an orbit of an artificial satellite around the earth.

FIG. 9 illustrates an orbit of an artificial satellite around the earth. The satellite orbit is subject to change due to rapid variations in the atmospheric density of the earth, disturbance in the upper atmosphere, etc., which act as random disturbance.

In FIG. 9, the state quantity x represents perturbation from the given satellite orbit in the direction from the center of the earth to the satellite in the plane including the satellite orbit. With $x_1 = x$ and $x_2 = dx/dt$, the satellite orbit of FIG. 9 is described by the following two-dimensional model.

$$X = \begin{pmatrix} x_1 \\ x_2 \end{pmatrix} = \begin{pmatrix} x \\ \dot{x} \end{pmatrix}, \tag{19}$$

$$f(X) = \begin{pmatrix} -bx_2 - \sin\frac{x_2}{x_1} - c\sin 2x_1 \end{pmatrix},$$

$$g(X) = \begin{pmatrix} 0 \\ abx_2 - bx_1 \end{pmatrix}$$

where X represents a two-dimensional state quantity corresponding to the state quantity in equation (5), functions f(X) and g(X) correspond to the functions in the right-hand side of equation (5) and have two-dimensional function values, and a, b and c are each a constant.

Figure 10:
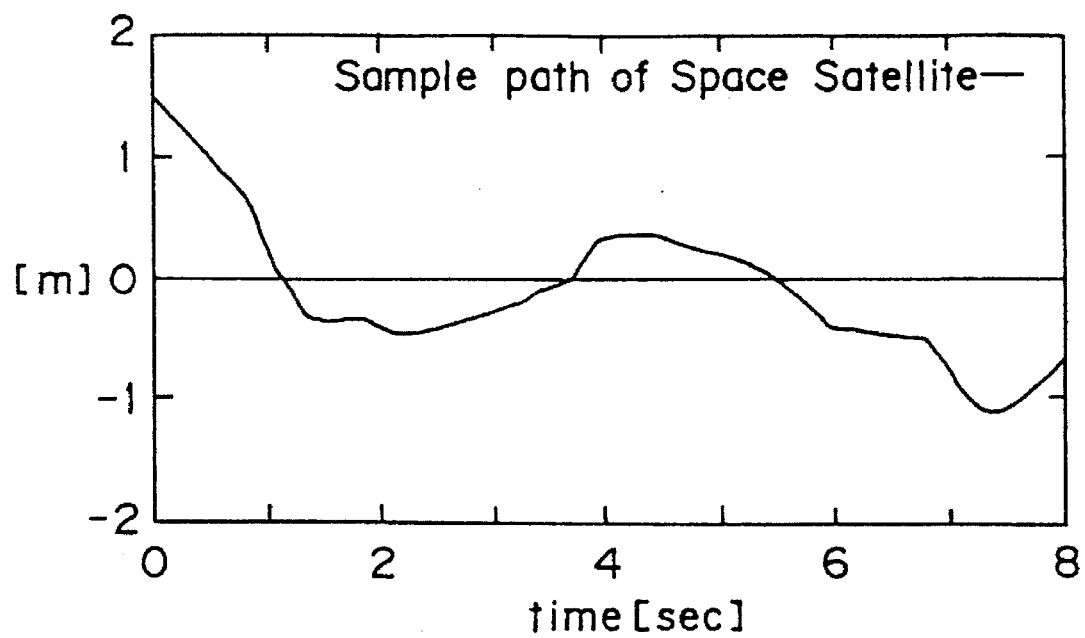
FIG. 10 illustrates the result of a simulation performed by the simulator of FIG. 2 on the satellite orbit model in FIG. 9.

FIG. 10 shows the result of a numerical simulation performed by the simulator of FIG. 2 on the satellite orbit model described by equation (19). In the simulation of FIG. 10, a=0.75, b=1.5, and c=0.5. The simulation timing step size h was set to h=$2^{-8}$ (second), and the initial condition at time $t_0=0$ were set such that $x_1(0)=1.5$(m), and $x_2(0)=-0.9$ (m/s). The a parameters and the b parameters to be stored in the memories 23-1 to 23-4 and 25-1 to 25-4 were set to the values given by equations (16.1) and (16.2).

Figure 11:
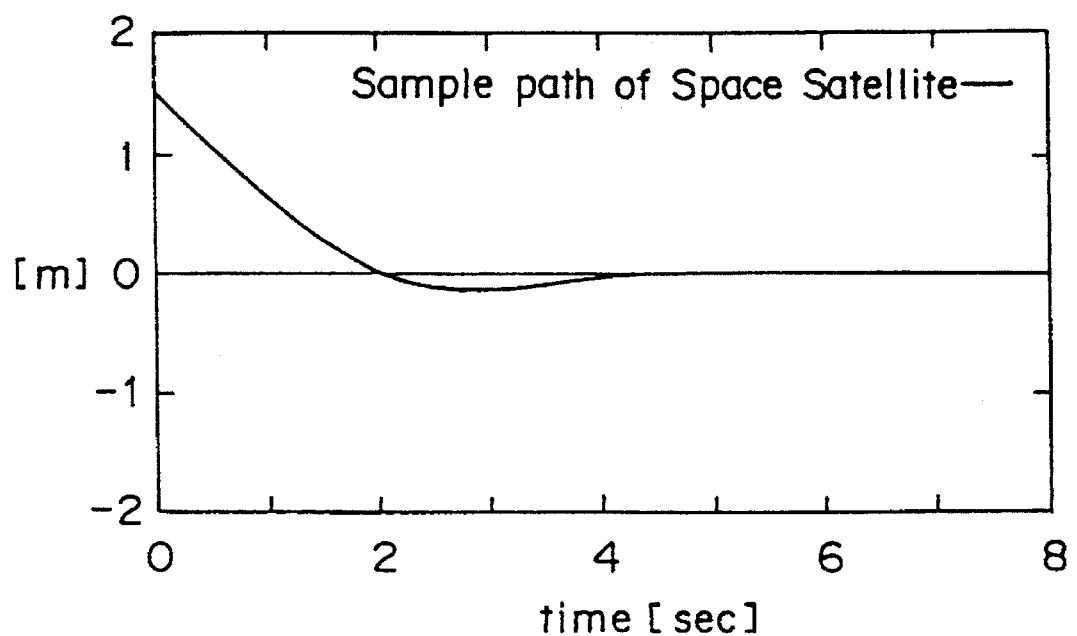
FIG. 11 illustrates the result of a simulation of a satellite orbit model which undergoes no random disturbance.

FIG. 11 shows the result of a simulation on an ideal satellite orbit model in which the random-disturbance effect was neglected in equation (19). Comparison of FIG. 10 and FIG. 11 reveals that the effect of random disturbance, such as variations in atmospheric density, on the satellite orbit cannot be neglected.

To compare the accuracy of the simulator of the present invention and another simulator, consider a one-dimensional model as given by the equation:

$$\dot{x}(t) = ax(t) + bx(t)w(t), \quad x(t_0) = x_0 \tag{20}$$

This corresponds to a model in which, in equation (5), x is assumed to be one-dimensional state quantity, and the functions f(x) and g(x) are defined as ax and bx, respectively. Each of a and b is a constant, and $x_0$ is the initial value of x at time $t_0$.

Since a stochastic differential equation in the form of equation (20) has a simple form for the functions f(x) and g(x), its exact solution can be obtained analytically as follows:

$$x(t) = x_0 \exp[[a - \tfrac{1}{2}b^2]t + bW(t)] \tag{21}$$

where W(t) is a stochastic process in the Brownian motion model and corresponds to a noise model w(t). The term, $-(\tfrac{1}{2})b^2 t$, within exp is a term which appears characteristically in stochastic integration.

Figure 12:
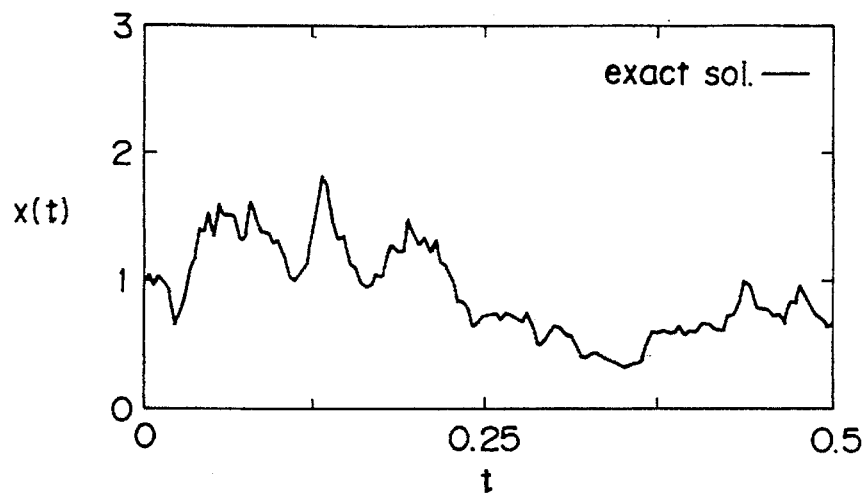
FIG. 12 illustrates the exact solution of a specific model.
Figure 13:
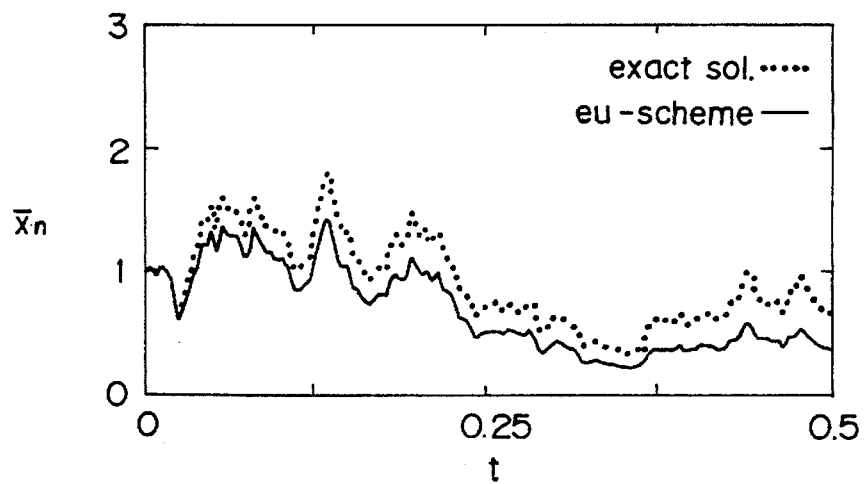
FIG. 13 illustrates the result of a simulation of the model of FIG. 12 by the 0.5-order Euler scheme.
Figure 14:
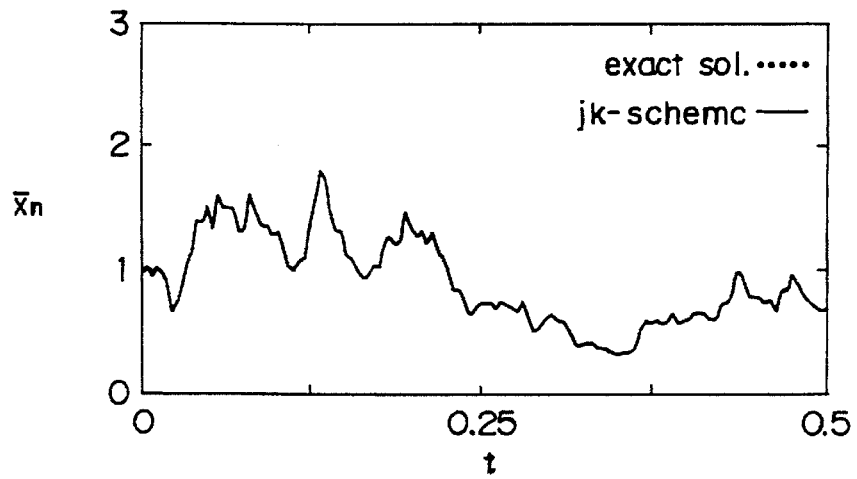
FIG. 14 illustrates the result of a simulation of the model of FIG. 12 by the simulator of the present invention.

FIG. 12 shows the result of sampling at intervals of $2^{-8}$ seconds with a=1, b=1, and $x_0=1$ in equation (21). FIG. 13 shows the simulation result by a simulator using the Euler scheme of 0.5-order accuracy, while FIG. 14 shows the simulation result by the simulator of the present embodiment. In the simulations of FIGS. 13 and 14 as well, a=1, b=1, $x_0=1$, and h (simulation step size)=$2^{-8}$ seconds.

Comparison of FIG. 12, FIG. 13 and FIG. 14 reveals that the simulation result by the present embodiment that assures 1.5-order accuracy of approximation is closer to the simulation result of the exact solution than the simulation result by the Euler scheme of 0.5-order accuracy. In FIG. 14, the simulation result and the exact solution are almost overlapped.

In the present embodiment, the values given by equations (16.1) and (16.2) are used as exemplary values of the a and b parameters. In the present invention, however, this is not restrictive. Other values can be used if they satisfy the constraints given by equations (14.1) to (14.22) and (15).

If the increment in the form of equations (7) to (11) is used, then also a simulator that assures an approximation accuracy higher than 1.5 order will be implemented.

According to the present invention, the simulation result with a high accuracy of 1.5 order can be obtained for a system that is affected by random disturbance.

Moreover, there is no need of obtaining derivatives of functions given in a mathematical model, and only given functional forms are needed to be entered, alleviating the burden imposed on an operator. Furthermore, the values of derivatives have not to be calculated, which provides a simulator which requires a smaller amount of calculation in numerical processing and has improved versatility.

As described above, the present invention enables a system that is affected by random disturbance to be simulated with high accuracy, allowing the precise analysis of the behavior of a system to be simulated and the implementation of a high-performance controller adapted to control that system.

What is claimed is:

1. A computerized simulator of variations in a state quantity in a physical system subjected to a random disturbance over time, comprising:

initialization means for inputting at least one function describing the physical system and initial data representing the state quantity;

increment generating means for generating, as function values of the at least one function given by said initialization means, at least three types of k parameters from said initial data by using a first random number, a second random number and a timing step size and generating an increment of the state quantity using said k parameters, said first and second random numbers being generated at random;

approximate data updating means for generating and updating approximate data representing approximate state quantity variations in the physical system subjected to the random disturbance, using said increment; and output means for outputting, at every timing step determined by said timing step size, a simulation result signal representing said approximate data.

2. A simulator according to claim 1, in which said increment generating means generates said time increment of the state quantity from said k parameters by use of said first random number, said second random number, and a term that is proportional to a square root of the timing step size and is not dependent on said first and second random numbers.

3. A simulator according to claim 2, in which said increment generating means generates said time increment of Runge-Kutta type.

4. A simulator according to claim 2, in which said approximate value updating means feeds an updated approximate value back to said increment generating means, and said increment generating means is responsive to said updated approximate value from said approximate value updating means to generate said time increment.

5. A simulator according to claim 4, in which said increment generating means further includes parameter generating means which generates a sample state quantity corresponding to the state quantity in the physical system using said approximate value and at least one of the timing step size and said first and second random numbers and generates said k parameters from said sample state quantity generated using said function, and increment producing means which produces said increment using said k parameters given by said parameter generating means, the timing step size and said first and second random numbers.

6. A simulator according to claim 5, in which said parameter generating means generates said k parameters explicitly.

7. A simulator according to claim 5, in which said increment generating means further includes first parameter storage means and second parameter storage means, and in which said parameter generating means generates said k parameters using said first parameter stored in said first parameter storage means, and said increment producing means produces said time increment from said k parameters using said second parameter stored in said second parameter storage means.

8. A simulator according to claim 7, in which said first and second parameters are selected to have values such that coefficients of terms up to 1.5 order of the timing step size in said time increment expanded with respect to the timing step size agree with coefficients of terms up to 1.5 order of the timing step size in a solution of a differential equation related to the state quantity describing the physical system when the solution is expanded with respect to the timing step size.

9. A simulator according to claim 5, in which said parameter generating means generates a plurality of parameters for each type of said k parameters for said approximate value and generates said sample state quantity by means of linear combination of said approximate value and said plurality of parameters already generated.

10. A simulator according to claim 9, in which said parameter generating means transforms said sample state quantity to said k parameters by use of said function.

11. A simulator according to claim 10, in which said increment producing means produces said time increment by means of linear combination of said k parameters.

12. A simulator according to claim 1, in which said increment generating means includes first random number generator for generating said first random number and second random number generator for generating said second random number that is independent of said first random number, and said time increment contains a term proportional to the timing step size, a term that is proportional to the product of the square root of the timing step size and said first random number but is not dependent on said second random number, a term that is proportional to the product of the square root of the timing step size and said second random number but is not dependent on said first random number, and a term that is proportional to the square root of the timing step size but is not dependent on said first and second random numbers.

13. A simulator according to claim 12, in which said first and second random numbers belong in sequences of normal random numbers with mean 0 and variance 1 which are independent of each other.

14. A computerized simulator according to claim 1, wherein said approximate data updating means generates said approximate data representing an approximate orbit of a satellite.

15. A computerized simulator according to claim 1, wherein said approximate data updating means generates said approximate data representing an approximate behavior of one of an industrial plant and a robot.

16. A computerized simulator of variations in a state quantity in a physical system over time, comprising:

initialization means for inputting a function describing the physical system and initial data of the state quantity;

increment generating means for generating an increment of the state quantity from the initial data by use of a first random number, a second random number, a timing step size, and said function without obtaining a derivative of said function, said first and second random numbers being generated at random;

approximate data updating means for generating and updating approximate data representing the variations in the state quantity in the physical system by use of said increment; and output means for outputting, at each timing step determined by said timing step size, a simulation result signal representing said approximate data.

17. A simulator according to claim 16, in which said initialization means inputs said function that describes the variations in the state quantity with time, and said increment generating means generates said time increment by calculating a value of said function.

18. A simulation method of describing variations in a state quantity in a physical system subjected to a random disturbance, comprising the steps of:

inputting at least one function describing the physical system and initial data of the state quantity;

generating at least three types of k parameters from said initial data as data as function values of said function using a first random number, a second random number and a timing step size, said first and second random numbers being generated at random respectively;

generating an increment of the state quantity using said k parameters;

generating and updating approximate data representing the variations in the state quantity in the physical system subjected to the random disturbance, using said increment; and outputting, at each timing step determined by said timing step size, a simulation result signal representing said approximate data.

19. A simulation method according to claim 18, further comprising the step of generating said time increment of the state quantity from said updated approximate value based on said function using said first and second random numbers and the timing step size.

20. A simulation method according to claim 18, in which said time increment of the state quantity is generated from said k parameters using said first and second random numbers and a term that is proportional to a square root of the timing step size and is not dependent on said first and second random numbers.

21. A simulation method according to claim 18, in which said time increment of the state quantity is generated from said k parameters using a term proportional to the timing step size, a term that is proportional to a product of the square root of the timing step size and said first random number and is not dependent on said second random number, a term that is proportional to a product of the square root of the timing step size and said second random number and is not dependent on said first random number, and a term that is proportional to the square root of the timing step size and is not dependent on said first and second random numbers.

22. A simulation method of describing variations in a state quantity in a physical system over time, comprising the steps of:

generating an increment of the state quantity from initial data of the state quantity using a first random number, a second random number, a timing step size and a function describing the physical system without using a derivative of said function, said first and second random numbers being generated at random;

generating approximate data representing the variations in the state quantity in the physical system using said increment; and outputting, at each time step determined by said timing step size, a simulation result signal representing said approximate data.

23. A computerized simulator which describes variations in a state quantity in a physical system subjected to a random disturbance over time by a function and random numbers, obtains approximate data representing approximate state quantity variations from initial data representing the state quantity and provides a simulation result signal, comprising:

initialization means for inputting the function and the initial data;

memory means for storing at least one predetermined parameter;

increment generating means for generating, as function values of the function given by said initialization means, at least three types of k parameters from the initial data by using the predetermined parameter, a first random number, a second random number and a timing step size and generating an increment of the state quantity using the k parameters, the first and second random numbers being generated at random;

approximate data updating means for updating the approximate data using the increment; and output means for outputting, at every timing step determined by the timing step size, a simulation result signal representing the approximate data.

24. A computerized simulator which describes variations in a state quantity in a physical system over time and obtains approximate data representing approximate state quantity variations, comprising:

initialization means for inputting a function describing the physical system and an initial data representing the state quantity;

memory means for storing at least one predetermined parameter;

increment generating means for generating an increment of the state quantity from the initial data by use of the predetermined parameter, a first random number, a second random number, a timing step size, and the function without obtaining a derivative of the function, the first and second random numbers being generated at random;

approximate data updating means for updating the approximate data by use of the time increment; and output means for outputting, at each timing step determined by the timing step size, a simulation result signal representing the approximate data.

* * * * *